(12) United States Patent
Fickler et al.

(10) Patent No.: US 11,001,457 B2
(45) Date of Patent: May 11, 2021

(54) METHOD AND APPARATUS FOR GENTLY DEPOSITING TRAYS

(71) Applicant: Multivac Sepp Haggenmüller SE & Co. KG, Wolfertschwenden (DE)

(72) Inventors: Bernhard Fickler, Hawangen (DE); Franz Osterrieder, Bad Grönenbach (DE); Oliver Wiedenmayer, Memmingen (DE)

(73) Assignee: Multivac Sepp Haggenmüller SE & Co. KG, Wolfertschwenden (DE)

( * ) Notice: Subject to any disclaimer, the term of this patent is extended or adjusted under 35 U.S.C. 154(b) by 0 days.

(21) Appl. No.: 16/353,372

(22) Filed: Mar. 14, 2019

(65) Prior Publication Data
US 2019/0283983 A1    Sep. 19, 2019

(30) Foreign Application Priority Data
Mar. 16, 2018    (DE) ...................... 10 2018 204 018.4

(51) Int. Cl.
*B65G 59/06*    (2006.01)
*B65G 59/10*    (2006.01)

(52) U.S. Cl.
CPC ......... *B65G 59/061* (2013.01); *B65G 59/108* (2013.01); *B65G 2201/0258* (2013.01); *B65G 2207/28* (2013.01); *B65G 2207/40* (2013.01)

(58) Field of Classification Search
CPC ............... B65G 59/061; B65G 59/108; B65G 2207/40; B65G 2207/28; B65G 2201/0258; B65G 59/062; B65G 59/10

USPC ...................................................... 414/795.6
See application file for complete search history.

(56) References Cited

U.S. PATENT DOCUMENTS

| | | | | |
|---|---|---|---|---|
| 3,741,410 A | * | 6/1973 | Henschke | B65G 59/108 |
| | | | | 414/795.6 |
| 4,121,404 A | * | 10/1978 | Davis | B65B 7/165 |
| | | | | 53/329 |
| 4,288,003 A | | 9/1981 | Fries | |
| 4,943,207 A | * | 7/1990 | Provan | B65G 59/108 |
| | | | | 221/222 |
| 5,064,093 A | * | 11/1991 | Davis | B65G 59/108 |
| | | | | 221/222 |

(Continued)

FOREIGN PATENT DOCUMENTS

| | | |
|---|---|---|
| CN | 104071557 A | 10/2014 |
| DE | 2740921 A1 | 3/1979 |

(Continued)

*Primary Examiner* — Lynn E Schwenning
(74) *Attorney, Agent, or Firm* — Husch Blackwell LLP (57) ABSTRACT

A method for operating a tray conveying apparatus, wherein a tray edge of a tray to be destacked is guided in contact with and along a support until the tray has been deposited on a conveying unit positioned therebelow. An apparatus for destacking and further conveying trays that may comprise a destacker for destacking trays, wherein the destacker may also comprise a frame for accommodating at least one tray stack and a plurality of destacking screws configured to be operated in a respective direction of rotation. Each destacking screw may comprise a helically configured spiral or groove with a support. A conveying unit may be positioned below the destacker and used for receiving and transporting the destacked trays from the destacker.

14 Claims, 4 Drawing Sheets

(56) References Cited

U.S. PATENT DOCUMENTS

| | | | | |
|---|---|---|---|---|
| 6,098,379 | A * | 8/2000 | Spatafora | B65B 35/04 |
| | | | | 414/788.9 |
| 7,603,827 | B2 * | 10/2009 | Boyer, Jr. | B65B 59/04 |
| | | | | 53/250 |
| 9,102,480 | B2 * | 8/2015 | Snapp | B65G 57/00 |
| 10,556,758 | B1 * | 2/2020 | Flaming | B65B 57/20 |
| 2007/0278240 | A1 * | 12/2007 | Dideriksen | B65G 59/105 |
| | | | | 221/1 |
| 2015/0336753 | A1 * | 11/2015 | Lykkegaard | B64F 1/368 |
| | | | | 414/788.2 |

FOREIGN PATENT DOCUMENTS

| | | |
|---|---|---|
| DE | 4315100 A1 | 11/1994 |
| DE | 202014008161 U1 | 3/2015 |
| EP | 1685047 B1 | 10/2008 |
| EP | 3246277 A1 | 11/2017 |
| GB | 2468667 A | 9/2010 |
| JP | 08217249 A | 8/1996 |

\* cited by examiner

METHOD AND APPARATUS FOR GENTLY DEPOSITING TRAYS

CROSS-REFERENCE TO RELATED APPLICATIONS

This application claims priority to German Patent Application No. 10 2018 204 018.4 filed on Mar. 16, 2018 to Bernhard Fickler, Franz Osterrieder, and Oliver Wiedenmayer currently pending, the entire disclosure of which is incorporated herein by reference.

FIELD OF THE INVENTION

The present invention relates to a method by means of which trays from a stack of trays can be deposited gently on a conveying unit, individually or in groups, and to a corresponding apparatus for gently depositing trays on a conveying unit.

BACKGROUND OF THE INVENTION

For packaging a wide range of consumer products, in particular foodstuffs, stackable packages are used. Examples of this are the plastic trays, which are normally used in the field of meat products and which, after having been filled, can be sealed with a film. Often, the packages are stored and shipped in stacks in order to save space. However, for the purpose of filling with products, the packages must then be fed, individually or in groups, to a filling station.

For example, it is known from practice to drop, by means of a destacking device that accommodates a stack of plastic trays, the respective lowermost tray of the stack at certain time intervals onto a conveyor belt running below the destacking device. The trays separated from the stack in this way are then conveyed by means of the conveyor belt to a filling station, where they are filled with the desired products, in particular foodstuffs. Subsequently, the filled trays are advanced to a sealing station, where they are sealed with a plastic film.

SUMMARY OF THE INVENTION

A destacking device, by means of which the respective lowermost tray is dropped, at fixed time intervals, from a stack of trays onto a conveyor belt running below the destacking device is known from EP 1 685 047 B1.

The dropping of trays, in particular packaging trays, from a stack onto a conveyor belt running below the stack is disadvantageous insofar as in particular light trays may bounce off the conveyor belt after having struck the latter. The tray may then possibly not be positioned exactly on the conveyor belt according to a desired position for a subsequent filling process. Even an only slight rebound suffices to render the orientation of the tray on the conveyor belt unpredictable, which may be disadvantageous in subsequent processing steps. In particular, additional working steps may then be necessary for bringing the trays, which are positioned irregularly on the conveyor belt, into a precise position for the filling process.

If the dropped tray bounces off the conveyor belt, i.e. does not come to a standstill thereon immediately, this may also lead to irregular slipping of the conveyor belt below the dropped trays. This is problematic insofar as it may cause irregular distances between trays that are dropped one behind the other in the conveying direction.

It is the object of the present invention to provide a method and an apparatus for conveying trays, by means of which trays to be destacked can be transferred precisely to a conveying unit, so that subsequent processing operations on the trays can be carried out more easily.

This object is achieved by the respective subject matters of claims 1 and 7. The dependent claims each disclose advantageous embodiments of the present invention.

Although the background of the present invention has been explained with reference to the de-stacking and transporting away of packages and although also a preferred case of use of the invention lies in this field, the invention is not limited thereto, but applicable quite generally to the destacking and transporting away of stackable trays from a stack of trays.

The present invention relates to a method for operating a tray conveying apparatus, comprising a destacker for destacking trays, wherein the destacker comprises a frame, used for accommodating at least one tray stack, as well as a plurality of destacking screws. The destacker further comprises a conveying unit positioned below the destacker and used for taking up destacked trays from the destacker. The destacking screws take hold of a tray to be destacked on the tray edge thereof and, through a continuous movement at a spiral that is helically formed on the de-stacking screws, they deposit the tray at a release position, at which the tray to be destacked is placed on the conveying unit. Due to the rotational movement of the respective destacking screws, the tray taken up thereat is linearly displaced along the helix path down to the conveying unit.

According to the present invention, the tray edge of the tray to be destacked is guided in contact with and along a support of the helically configured spiral until the tray has been deposited on the conveying unit at the release position.

Hence, the present invention relates to a method for operating a tray conveying apparatus, ac-cording to which a tray edge of a tray to be destacked is guided in contact with and along a guiding support until the tray has been deposited on a conveying unit positioned therebelow. The present invention also relates to a corresponding apparatus for destacking and further conveying trays.

It follows that the tray is carried along a continuous guide until it is deposited, the tray to be de-stacked be thus transferable to the conveying unit in a precise manner. The deposition of the tray at a predetermined position of the conveying unit can thus be controlled excellently.

Making use of the present invention, the tray to be destacked can be deposited gently on the conveying unit, so that it will assume a predetermined, precise position on the conveying unit and will be prevented from bouncing off to an unpredictable position. This is primarily due to the fact that the tray to be destacked is, within the helically configured spiral guide, held in contact with the support formed at the latter until it comes to rest on a conveying unit positioned therebelow. This prevents the tray from dropping in an uncontrolled manner, which could possibly cause the tray to slip on the conveying unit, i.e. not to be deposited at a predetermined, precise position for further processing.

Preferably, the tray edge of the tray deposited on the conveying unit projects, in a contact-free manner, at least partially into a release area formed at respective ends of the destacking screws, when the tray is at the release position. The tray, which has arrived on the conveying unit, can thus reliably be protected against undesirable slipping in the transfer region, especially in cases where the conveying unit is advanced cyclically. In this way, it can also be guaranteed that further conveyance of the tray from the release areas formed at the destacking screws will take place only along a predetermined, desired conveying direction.

According to a variant of the present invention, the release area formed at the respective de-stacking screws will be arranged to face the tray edge of the tray deposited at the release position, so as to release the tray in the conveying direction of the conveying unit. The tray can thus be removed precisely from the transfer region and advanced to a filling station positioned further downstream.

According to an embodiment, the tray edge of the tray deposited on the conveying unit projects, in a contact-free manner, at least partially into the helically configured spiral of the respective destacking screws, when the tray is at the release position. The helically configured spiral may here extend far enough in the direction of the conveying unit for defining, at least partially, the release area. This embodiment is particularly suitable for conveying rectangular trays and can be produced at low cost.

Preferably, the destacking screws are controlled in synchronization with respect to an operation of the conveying unit. This allows a continuous flow of trays to be destacked, so that a packaging process can be improved in its entirety. The conveying unit works here preferably with a clocked feed, the trays being deposited while the conveying unit is standing still. According to an advantageous variant, a tray is conveyed along the destacking screws during a feed cycle of the conveying unit. i.e., it moves along the whole guide path formed at the respective destacking screws.

Preferably, the conveying unit feeds the trays deposited thereon to a tray sealing process of a cyclically operating tray sealer. A precise transfer of the trays from the destacker to the conveying unit will also lead in particular to an improved tray sealing process in the production flow further downstream, so that, on the whole, a higher manufacturing quality can be achieved by means of the present invention.

The present invention also relates to a tray conveying apparatus, comprising a destacker for destacking trays, wherein the destacker comprises a frame, used for accommodating at least one tray stack, and a plurality of destacking screws configured to be operated in respective directions of rotation, each destacking screw comprising—as a guide path—a helically configured spiral with a support. In addition, the destacker comprises a conveying unit positioned below the destacker and used for receiving thereon destacked trays from the destacker.

According to the present invention, the destacking screws are configured such that, during de-stacking of a tray, a tray edge of the tray is guided in contact with and along the support of the helically configured spiral until the tray is deposited on the conveying unit. The trays to be de-stacked can thus gently be deposited on the conveying unit precisely at the correct positions. The successively deposited trays can thus be further conveyed in a precisely positioned manner at predetermined distances from one another.

Preferably, the destacking screws are configured such that the tray edge of the tray deposited on the conveying unit projects, in a contact-free manner, at least partially into a release area formed at respective ends of the destacking screws. The respective release areas define a predetermined tolerance range, within which the deposited trays can be held at a predetermined location on the conveying unit, even if the conveying unit is operated with changing, possibly jerky accelerations.

Preferably, the release area comprises a recess formed, at least sectionwise, at the end of the destacking screw. The geometry of a respective recess may be adapted to different tray shapes, e.g. with respect to rectangular and/or round trays.

Preferably, the destacking screws are configured and synchronously controllable such that the release area formed at the respective destacking screws faces the tray edge of the tray deposited at the release position, so as to allow further conveying of the tray in the conveying direction of the conveying unit. In this way, a positionally accurate as well as targeted flow of trays in the direction of a filling station that is positioned further downstream is accomplished.

According to a variant, the destacking screws are configured such that the tray edge of the tray deposited on the conveying unit projects, in a contact free manner, at least partially into the helically configured spiral of the respective destacking screws. This allows the spirals, which helically terminate at the ends of the respective destacking screws, to be used as release areas for trays of different heights, preferably for rectangular tray bodies.

A structural design of the destacking screws that allows particularly precise depositing of the trays on the conveying unit are destacking screws which are configured for continuously conveying, in a synchronously controlled manner, the trays to be destacked until the trays are deposited on the conveying unit. The respective trays to be destacked can thus be guided by means of a linear stroke, without any interruption, down to the conveying unit so that a controlled and gentle deposition thereon is possible.

Preferably, the destacking screws are attached to the frame of the destacker in a vertically adjustable manner. Alternatively or additionally, the destacker as a whole may attached to the conveying unit in a vertically adjustable manner. As a result, the present invention is applicable with respect to different trough heights.

A particularly smooth transition of the trays to be conveyed will take place between the destacker and the conveying unit, when a drive of the destacking screws is controllable in synchronization with respect to an operation of the conveying unit. Product feed cycles as well as production rates can be optimized in this way.

Preferably, a tray sealer is provided with a tray conveying apparatus according to the present invention.

The present invention also supports an improved hygienic execution of the packaging process, since correction steps, e.g. executing after the destacking process a manual repositioning of trays that have not been destacked in a positionally precise manner, can be avoided. In addition, the features used for the present invention can be produced at low cost. The gist of the invention, i.e. the possibility of gently depositing trays, in order to guarantee a precise further conveyance, is therefore accompanied by additional positive side effects, which are of a particularly advantageous nature in food packaging processes.

Other aspects and advantages of the present invention will be apparent from the following detailed description of the preferred embodiments and the accompanying drawing figures.

DESCRIPTION OF THE SEVERAL VIEWS OF THE DRAWINGS

In the following, an advantageous embodiment of the present invention will be explained in more detail making reference to a drawing, in which the individual figures show.

DETAILED DESCRIPTION OF THE INVENTION

The invention will now be described with reference to the drawing figures, in which like reference numerals refer to like parts throughout. For purposes of clarity in illustrating the characteristics of the present invention, proportional relationships of the elements have not necessarily been maintained in the drawing figures.

The following detailed description of the invention references specific embodiments in which the invention can be practiced. The embodiments are intended to describe aspects of the invention in sufficient detail to enable those skilled in the art to practice the invention. Other embodiments can be utilized and changes can be made without departing from the scope of the present invention. The present invention is defined by the appended claims and the description is, therefore, not to be taken in a limiting sense and shall not limit the scope of equivalents to which such claims are entitled.

Figure 1:
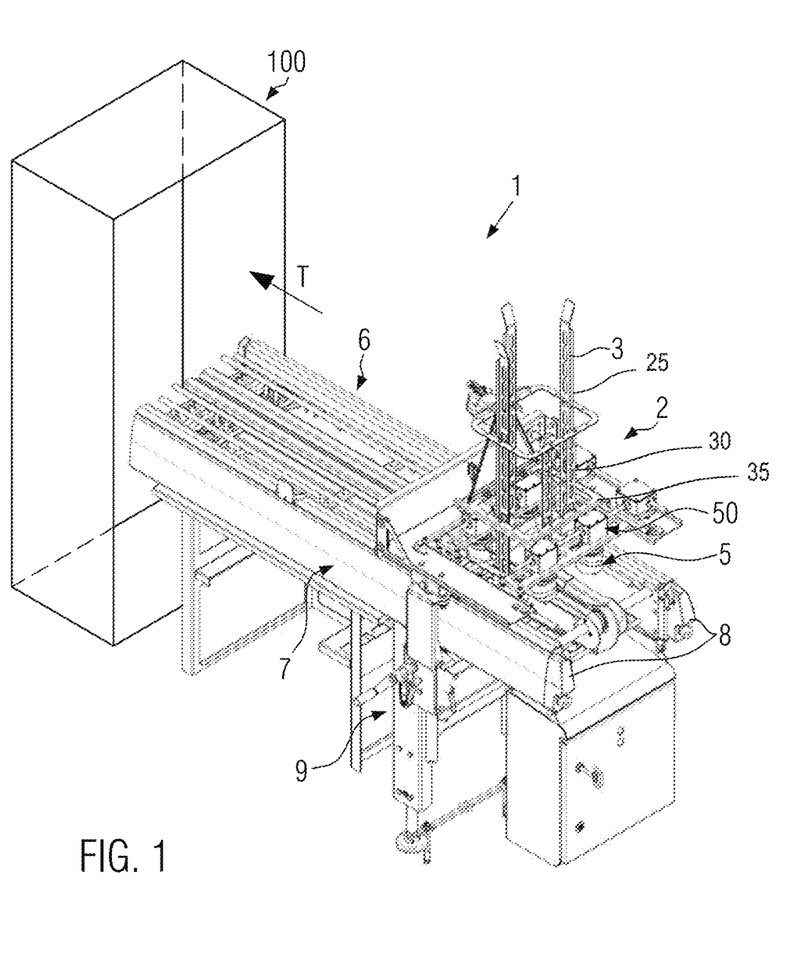
FIG. 1 is a schematic perspective view of an embodiment of a tray conveying apparatus as a feed system for a tray sealer in accordance with the teachings of the present disclosure.

FIG. 1 shows a tray conveying apparatus 1. The tray conveying apparatus 1 comprises a de-stacker 2 for destacking trays S (cf. FIG. 2). The destacker 2 comprises a frame 3 for accommodating at least one tray stack 4 (cf. FIG. 2). Furthermore, the destacker 2 comprises a plurality of destacking screws 5 capable of taking hold of the tray edge R of a tray S to be destacked and lowering the latter in a linearly guided manner down to a predetermined level through a continuous rotational movement.

FIG. 1 also shows that below the destacker 2 a conveying unit 6 is positioned for taking up de-stacked trays S from the destacker 2. The tray conveying apparatus 1 comprises a machine frame 7 which simultaneously constitutes the machine rack of the conveying unit 6. The destacker 2 is secured in position on a lateral frame 8 of the machine frame 7.

By means of a drive 9 shown in FIG. 1, the destacker 2 is supported such that it is vertically adjustable relative to the machine frame 7 of the tray conveying apparatus 1. FIG. 1 illustrates another embodiment wherein the destacking screws 5 are attached to the frame 3 of the destacker 2 in a vertically adjustable manner. More specifically, vertical upstanding rails 25 of the frame 3 include a plurality of holes 30 which extend along a length of the rail 25 as shown. Destacking screws 5 are operably connected to horizontal frame 35 and the position of destacking screws 5 and horizontal frame 35 is adjustable in a vertical direction (along the length of vertical upstanding rails 25) as shown.

Horizontal frame 35 may be secured to frame 3 at varying vertical positions through corresponding holes 30 on the vertical upstanding rails 25 through securing the frame 35 using a fastener inserted through one of the holes 30 on one or more vertical upstanding rails 25 to selectively fasten the horizontal frame 35 to the vertical rails 25 at varying heights relative to conveying unit 6.

Making use of the destacking screws 5, individual trays S or more than one tray S at a time are transferred to the conveying unit 6 positioned therebelow, whereupon the trays S can be advanced in the conveying direction T. The destacker 2 is mounted, preferably on a variable height level, above the conveying unit 6. The destacking screws 5 hold the trays S during the destacking process in contact therewith until the trays S come to rest on the conveying unit 6, so that the trays S will always be transferred gently and precisely to the conveying unit 6.

Figure 2:
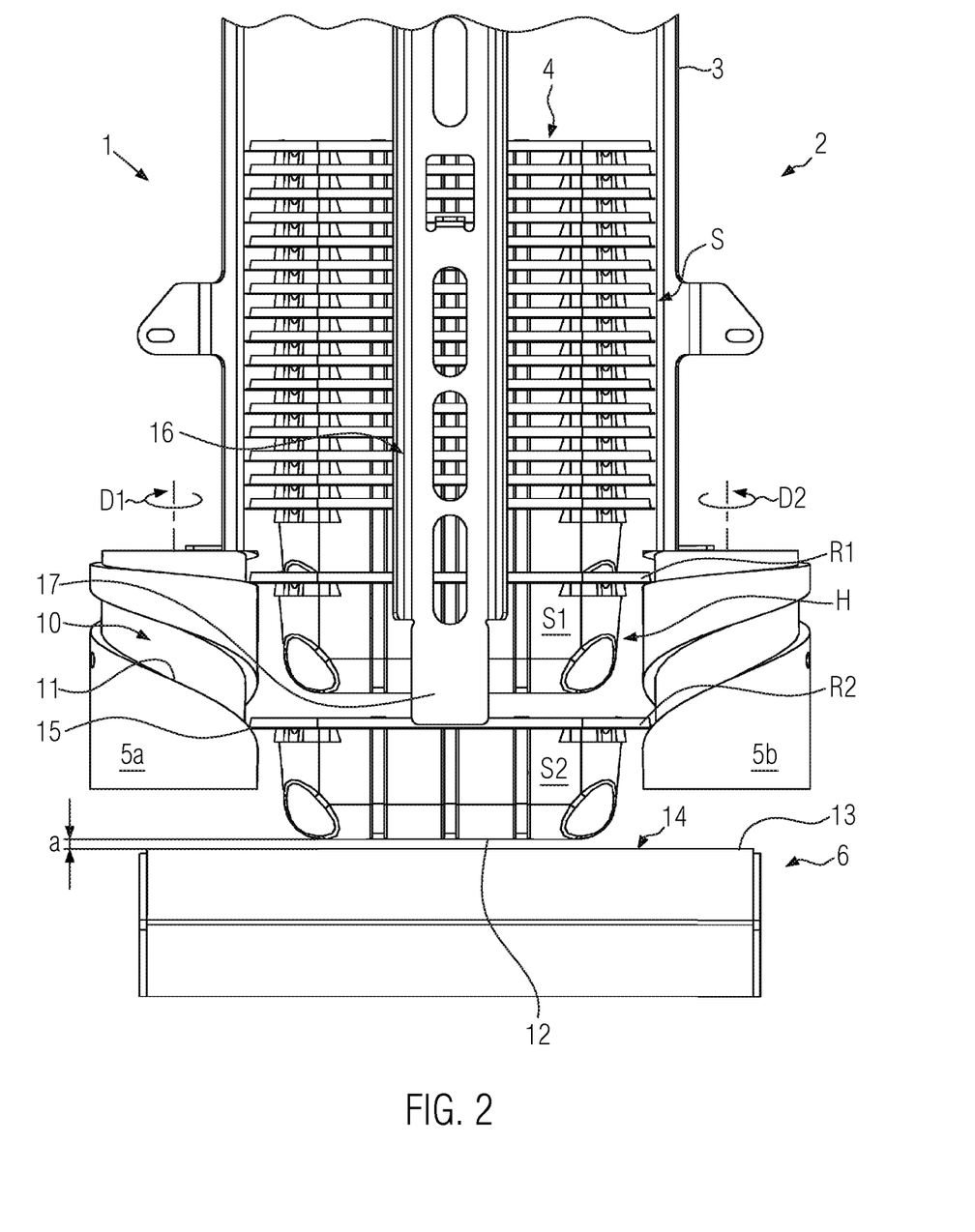
FIG. 2 shows a schematic front view of an embodiment of a tray conveying apparatus in accordance with the teachings of the present disclosure.

FIG. 2 shows, in the conveying direction T, the frame 3 of the destacker 2 with a tray stack 4 accommodated therein, a first tray S1 and a second tray S2 being in engagement with the two destacking screws 5a, 5b shown in FIG. 2. The destacking screws 5a, 5b are configured such that, by means of a stroke movement H in the direction of the conveying unit 6 executed at the trays S1, S2, they will deposit the trays S1, S2 held thereat. In the course of this process, the trays S1, S2 are carried down to the conveying unit 6 in a controlled and continuous manner, by means of a rotational movement of the destacking screws 5a, 5b, along a spiral 10 helically formed on the destacking screws 5a, 5b and in contact with a support 11 formed at this spiral 10.

Further downstream of the tray conveying apparatus 1, a tray sealer 100 is schematically shown in FIG. 1. Before the trays S are supplied to the tray sealer 100, they are filled with products along a section of the conveying unit 6.

FIG. 2 shows a snapshot during the destacking process of a tray S2. A bottom 12 of the tray S2 to be destacked is here positioned above a conveyor belt 13 of the conveying unit 6 at a short distance a therefrom. Through a continued rotational movement D1, D2 of the respective de-stacking screws 5a, 5b, the tray S2 is carried by the latter, with a continuously decreasing distance a, down to the surface 14 of the conveyor belt 13.

A tray edge R2 of the tray S2 remains here in contact with a support 11 of a helically configured spiral 10 of the respective destacking screws 5a, 5b until the bottom 12 of the tray S2 has arrived on the surface 14 of the conveyor belt 13. A lower edge 15 of the tray edge R2 is here supported by means of the support 11 of the helically configured spiral 10 until the tray S2 has been deposited on the conveying unit 6.

In addition, FIG. 2 shows that the frame 3 of the destacker 2 has a rail 16, which is fixed to the frame 3 along the tray stack 4. The rail 16 has a rail end 17 facing the conveying unit 6 and having sufficiently long dimensions for being able to prevent, during the delivery stroke movement H executed by means of the destacking screws 5a, 5b, the trays S1, S2 to be destacked from slipping unintentionally out of the respective spirals 10 of the destacking screws 5a, 5b.

Figure 3:
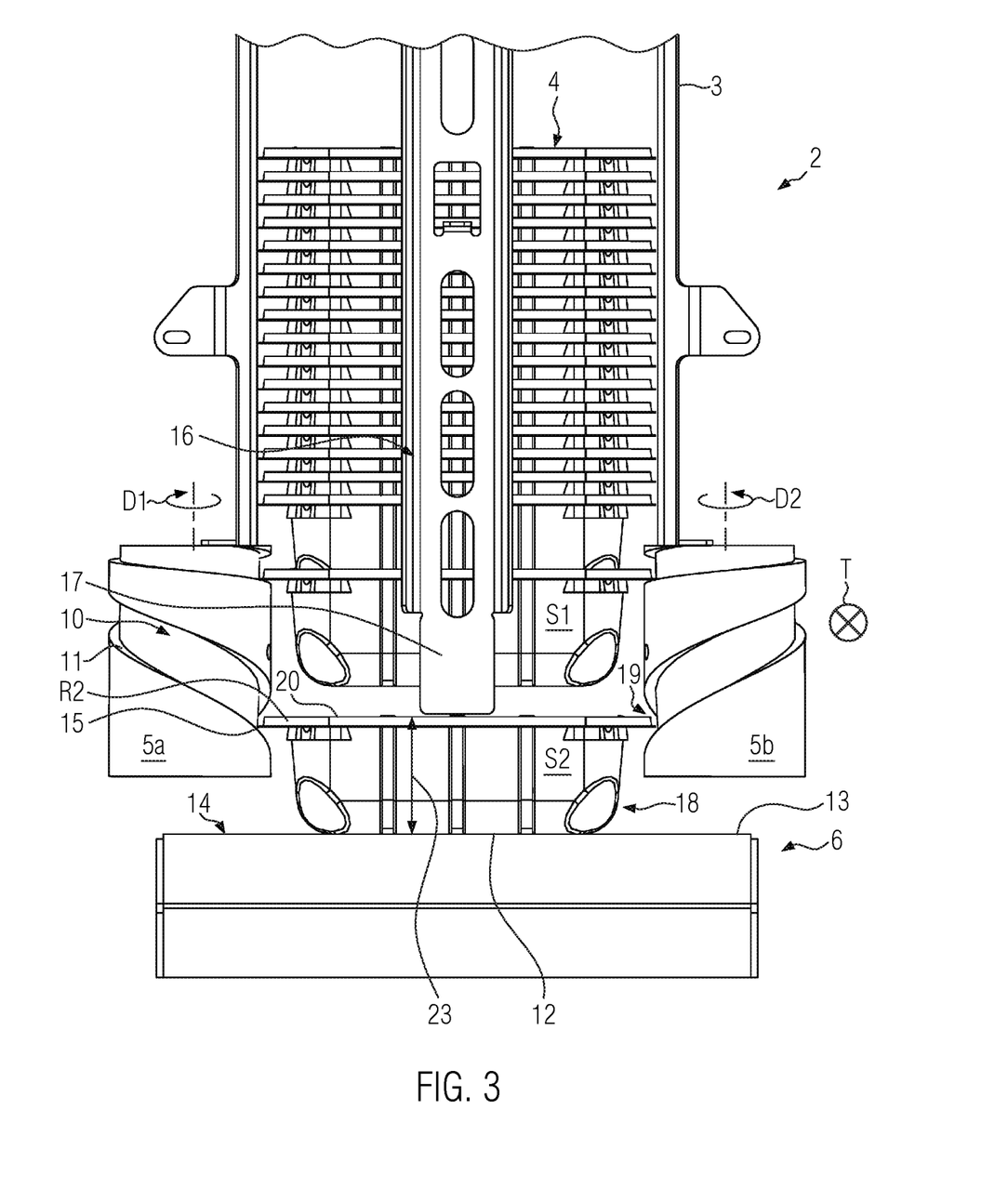
FIG. 3 is another schematic representation of the tray conveying apparatus of FIG. 2 showing a tray disposed at the release position.

FIG. 3 shows the tray S2 at a release position 18. At the release position 18, the bottom 12 of the tray S2 rests on the conveyor belt 13 of the conveying unit 6. The lower edge 15 of the tray edge R2 is now no longer in contact with the support 11 of the helically configured spiral 10, but is positioned in a contact-free manner within a release area 19.

After having arrived at the release position 18, the tray S2 is no longer in contact with the de-stacking screws 5a, 5b. According to FIG. 3, the release area 19 is formed by a terminating end of the helically configured spiral 10. Also two additional destacking screws 5c, 5d (cf. FIG. 4), which are, however, not shown in FIG. 3 and which are arranged behind the destacking screws 5a, 5b in the image plane, are, like the destacking screws 5a, 5b, positioned such that they face the tray S2.

FIG. 3 also shows that an upper edge 20 of the deposited tray S2 is positioned a short distance below the rail end 17, so that the tray S2 can be conveyed along the conveyor belt 13 in the conveying direction T away from the release area 19 of the destacking screws 5a, 5b.

Figure 4:
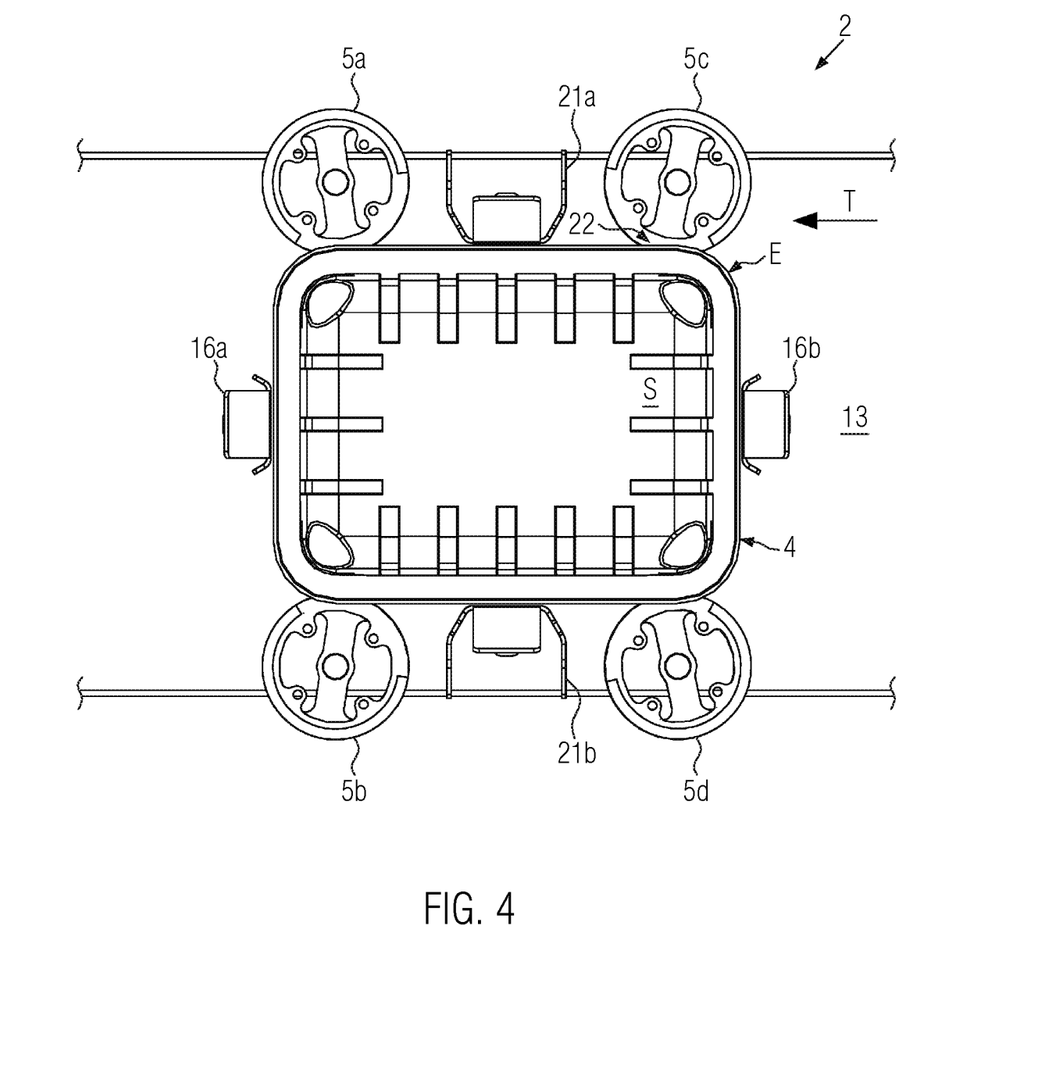
FIG. 4 is a schematic top view of one embodiment of the tray conveying apparatus in accordance with the teachings of the present disclosures showing a tray taken up between the destacking screws.

FIG. 4 shows a top view in the area of the respective destacking screws 5a, 5b, 5c, 5d with a tray S taken up between the latter, respective rails 16a, 16b used as a guide as well as lateral frame parts 21a, 21b, which are also adapted to be used for guaranteeing that trays S to be destacked will be guided linearly.

The respective destacking screws 5a, 5b, 5c, 5d are assigned to corner areas E of the tray S. When the tray S has been deposited on the conveyor belt 13, the respective corner areas E of the tray S project into the release area 19 of the respective destacking screws 5a, 5b, 5c, 5d, i.e. the respective release areas 19 face the corner areas E of the tray S.

The release areas 19 each have a recess 22, which is configured at the end of the respective destacking screw 5a, 5b, 5c, 5d for releasing the deposited trays S, so that the tray S can be transported away from the release area 19 of the destacking screws 5a, 5b, 5c, 5d in a contact-free manner.

Figure 5:
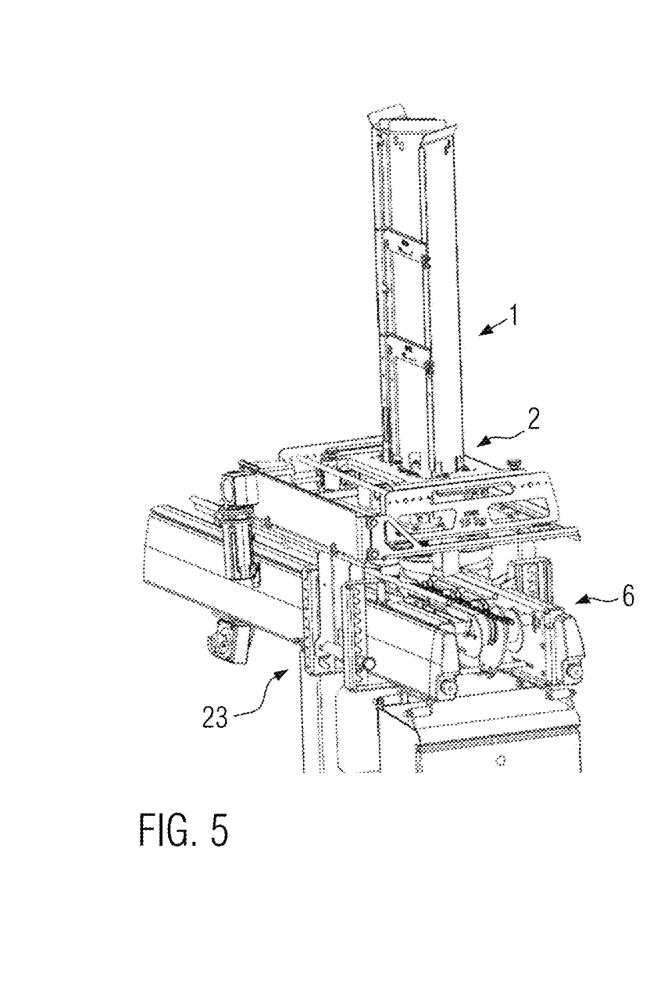
FIG. 5 is a schematic perspective view of another embodiment of the tray conveying apparatus in accordance with the teachings of the present disclosure showing a level adjustment mechanism.

FIG. 5 shows the tray conveying apparatus 1 with a level adjustment mechanism 23 for the de-stacker 2, so that the latter can be positioned above the conveying unit 6 relative to the conveyor belt 13, which passes below the destacker 2, on different height levels. It follows that, making use of the level adjustment mechanism 23, the destacker 2 can be vertically adjusted with respect to a varying trough depth 23 shown in FIG. 3, so that trays S of different heights can be deposited gently on the conveying unit 6 according to the principle disclosed by the present invention.

Thanks to the present invention, trays to be destacked can be transferred along a vertical guide path to a horizontal conveying plane smoothly, gently and in a controlled manner because the trays are not released from the vertically configured guide path until they have arrived in the horizontal conveying plane. This allows a conveying transfer process with high positional accuracy, so as to feed the trays precisely to a subsequent, downstream positioned filling process.

From the foregoing, it will be seen that this invention is one well adapted to attain all the ends and objects hereinabove set forth together with other advantages which are obvious and which are inherent to the structure. It will be understood that certain features and sub combinations are of utility and may be employed without reference to other features and sub combinations. This is contemplated by and is within the scope of the claims. Since many possible embodiments of the invention may be made without departing from the scope thereof, it is also to be understood that all matters herein set forth or shown in the accompanying drawings are to be interpreted as illustrative and not limiting.

The constructions and methods described above and illustrated in the drawings are presented by way of example only and are not intended to limit the concepts and principles of the present invention. Thus, there has been shown and described several embodiments of a novel invention.

As is evident from the foregoing description, certain aspects of the present invention are not limited by the particular details of the examples illustrated herein, and it is therefore contemplated that other modifications and applications, or equivalents thereof, will occur to those skilled in the art. The terms "having" and "including" and similar terms as used in the foregoing specification are used in the sense of "optional" or "may include" and not as "required". Many changes, modifications, variations and other uses and applications of the present construction will, however, become apparent to those skilled in the art after considering the specification and the accompanying drawings. All such changes, modifications, variations and other uses and applications which do not depart from the spirit and scope of the invention are deemed to be covered by the invention which is limited only by the claims which follow.

What is claimed is:

1. A method for operating a tray conveying apparatus, the method comprising the steps of:
    placing at least one tray stack in a destacker for destacking trays, wherein the destacker comprises a frame used for accommodating the at least one tray stack, a plurality of destacking screws, and a conveying unit positioned below the destacker for receiving deposited destacked trays;
    taking hold of a single tray of the at least one tray stack on a tray edge of the single tray such that said tray edge is in contact with and supported by a helically configured spiral disposed on each of two or more of the plurality of destacking screws;
    guiding the tray edge of the single tray within the helically configured spiral, wherein said tray edge is in contact with and is guided along a support of the helically configured spiral;
    rotating the plurality of destacking screws continuously;
    maintaining contact between the tray edge of the single tray and the helically configured spiral until the single tray is moved to a release position, wherein at the release position a bottom of the single tray rests on the conveying unit;
    depositing the single tray onto the conveying unit at the release position; and
    one of attaching the plurality of destacking screws to the frame of the destacker in a vertically adjustable manner, or attaching the destacker to the conveying unit in a vertically adjustable manner.

2. The method according to claim 1, wherein the tray edge of the single tray deposited on the conveying unit projects, in a contact-free manner, at least partially into a release area formed at respective ends of the destacking screws when the tray is at the release position.

3. The method according to claim 2, wherein the release area formed at the respective destacking screws will be arranged to face the tray edge of the single tray deposited at the release position, so as to release the single tray in a conveying direction of the conveying unit.

4. The method according to claim 1, wherein the tray edge of the tray deposited on the conveying unit projects, in a contact-free manner, at least partially into the helically configured spiral of the respective plurality of destacking screws when the tray is at the release position.

5. The method according to claim 1 further comprising the step of controlling the plurality of destacking screws in synchronization with an operation of the conveying unit.

6. The method according to claim 1, further comprising the step of feeding the deposited trays to a tray sealing process of a cyclically operating tray sealer using the conveying unit.

7. A tray conveying apparatus comprising:
a destacker for destacking trays, wherein the destacker comprises a frame for accommodating at least one tray stack and a plurality of destacking screws configured to rotate in a respective direction of rotation, each destacking screw comprising a helically configured spiral with a support;
a conveying unit positioned below the destacker and used for receiving a destacked tray from the destacker, wherein the destacking screws are disposed relative to the conveying unit and the helically configured spiral has a length such that, during destacking of a destacked tray, a tray edge of the destacked tray is guided in contact with and along the support of the helically configured spiral until the destacked tray comes to rest on the conveying unit; and
wherein at least one of the plurality of destacking screws are attached to the frame of the destacker in a vertically adjustable manner, or the destacker is attached to the conveying unit in a vertically adjustable manner.

8. The tray conveying apparatus according to claim 7, wherein the destacking screws have a release area formed at respective ends of the destacking screws, and the tray edge of the destacked tray deposited on the conveying unit projects, in a contact-free manner, at least partially into a release area formed at respective ends of the destacking screws at a release position of the destacked tray.

9. The tray conveying apparatus according to claim 8, wherein the release area is a recess formed at the end of the destacking screw.

10. The tray conveying apparatus according to claim 7, wherein the destacking screws are synchronously controllable such that a release area formed at each of the respective destacking screws faces the tray edge of the destacked tray deposited at the release position, so as to release the destacked tray in the conveying direction of the conveying unit.

11. The tray conveying apparatus according to claim 7, wherein the destacking screws are configured such that the tray edge of the destacked tray deposited on the conveying unit projects in a contact free manner at least partially into the helically configured spiral of the respective destacking screws when the destacked tray is disposed at a release position, wherein at the release position, a bottom of the detached tray rests on the conveying unit.

12. The tray conveying apparatus according to claim 7, wherein the destacking screws are configured for continuously conveying, in a synchronously controlled manner, the trays in the at least one tray stack to be destacked until all the trays in the at least one tray stack are deposited on the conveying unit.

13. The tray conveying apparatus according to claim 7, further comprising a drive of the destacking screws being controllable in synchronization with respect to an operation of the conveying unit.

14. A tray sealer comprising a tray conveying apparatus according to claim 7.

* * * * *